Sept. 17, 1946.  H. J. LUTH  2,407,711
METHOD OF BUILDING AND FORMING PLYWOOD PARTS
Filed May 20, 1943  3 Sheets-Sheet 2

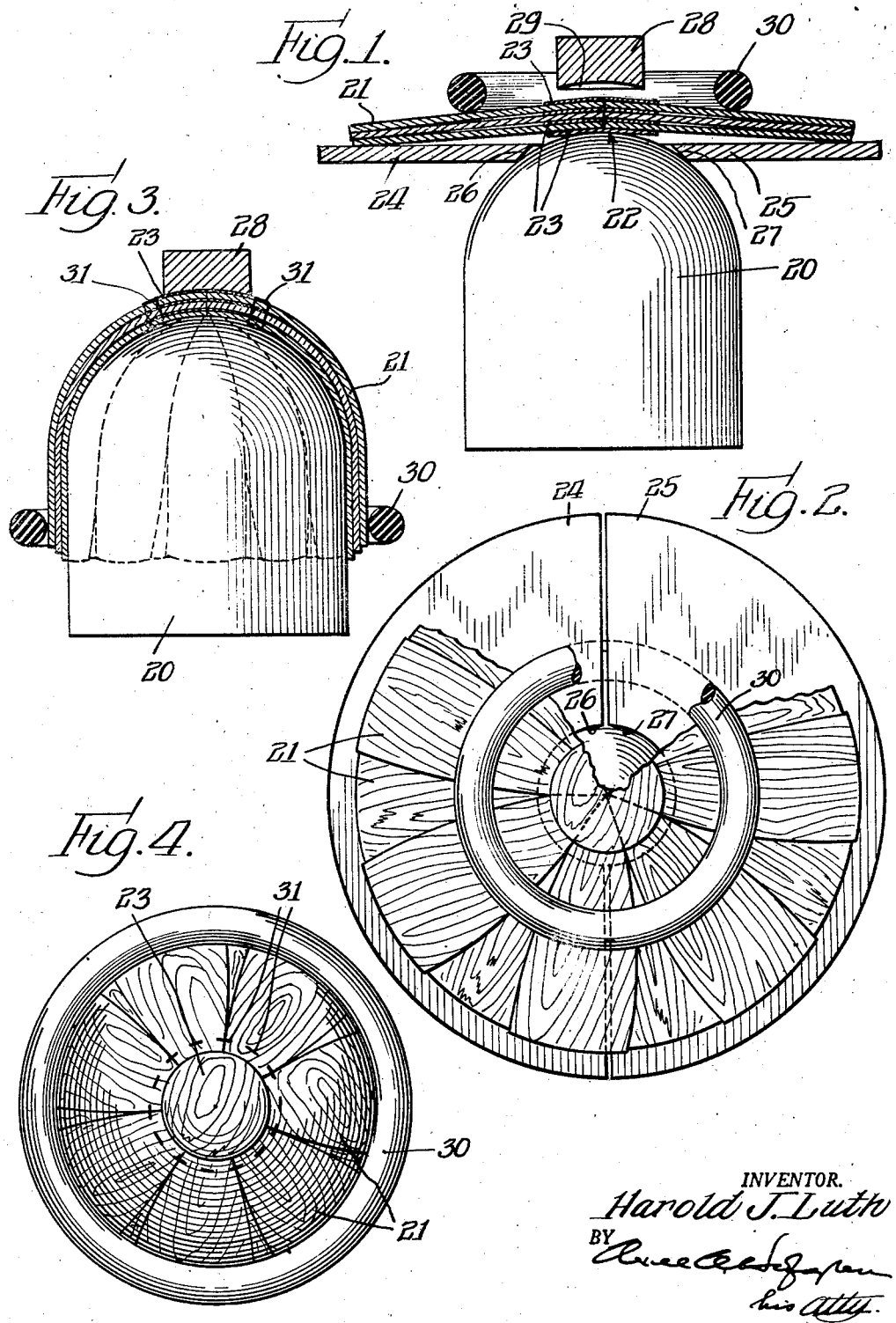

INVENTOR.
Harold J. Luth
BY
his atty.

Sept. 17, 1946.  H. J. LUTH  2,407,711
METHOD OF BUILDING AND FORMING PLYWOOD PARTS
Filed May 20, 1943  3 Sheets-Sheet 3
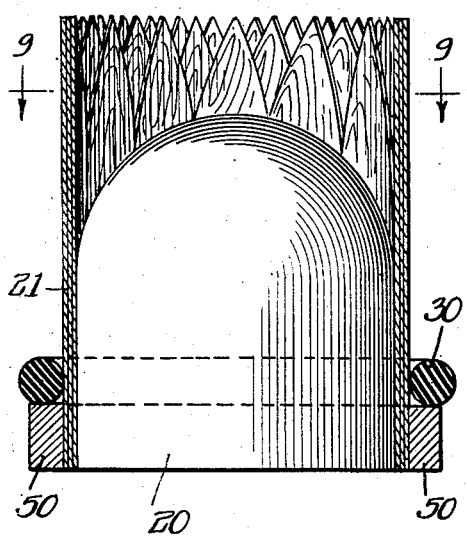
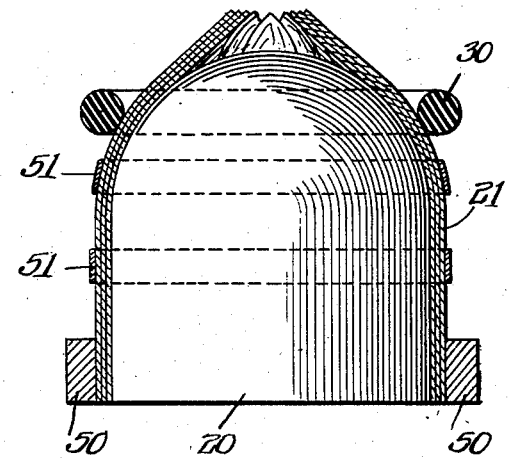
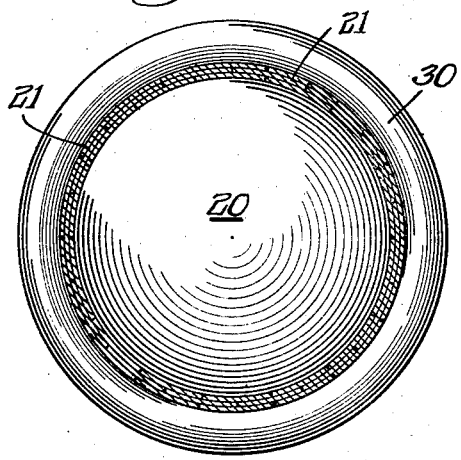
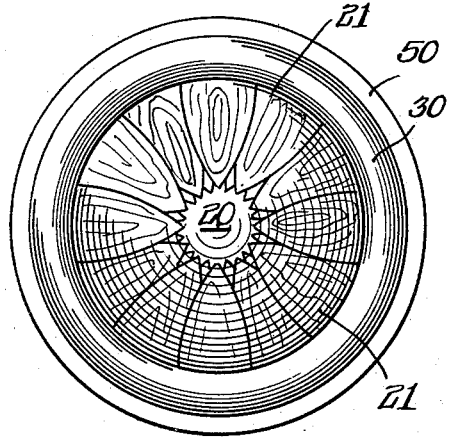
INVENTOR.
Harold J. Luth Patented Sept. 17, 1946

2,407,711

UNITED STATES PATENT OFFICE 2,407,711

METHOD OF BUILDING AND FORMING PLYWOOD PARTS

Harold J. Luth, Muskegon, Mich., assignor to The Brunswick-Balke-Collender Company, Chicago, Ill., a corporation of Delaware Application May 20, 1943, Serial No. 487,704

5 Claims. (Cl. 154—110)

More particularly the invention relates to a method of assembling the component parts of plywood used in molding fairings for aircraft, nose surfaces and the like, where it is necessary to assemble segments of the plywood with the grain at divers angles.

It is the general object of the invention to provide a new and improved method of building and forming plywood parts.

Another object is to provide a method of assembling plywood which is simple, and results in uniformity of assemblies without the use of highly skilled craftsmen.

Another object is to provide a method of building and forming plywood parts without the use of nails or staples which, upon removal, makes patching necessary.

Other objects and advantages will become readily apparent from the following detailed description, taken in connection with the accompanying drawings, in which:

Fig. 1 is a central vertical sectional view of an apparatus illustrating the manner in performing one step of the method.

Fig. 2 is a plan view of the parts arranged as in Fig. 1, certain parts being broken away.

Fig. 3 is a similar view illustrating a subsequent step.

Fig. 4 is a plan view of the parts as arranged in Fig. 3.

Fig. 7 is a central vertical section through an apparatus illustrating the manner in performing a modified form of the invention.

Fig. 8 is a similar view illustrating the parts during a subsequent step.

Fig. 9 is a top plan view of the parts shown in Fig. 7.

Fig. 10 is a top plan view of the parts shown in Fig. 8.

Figure 5:
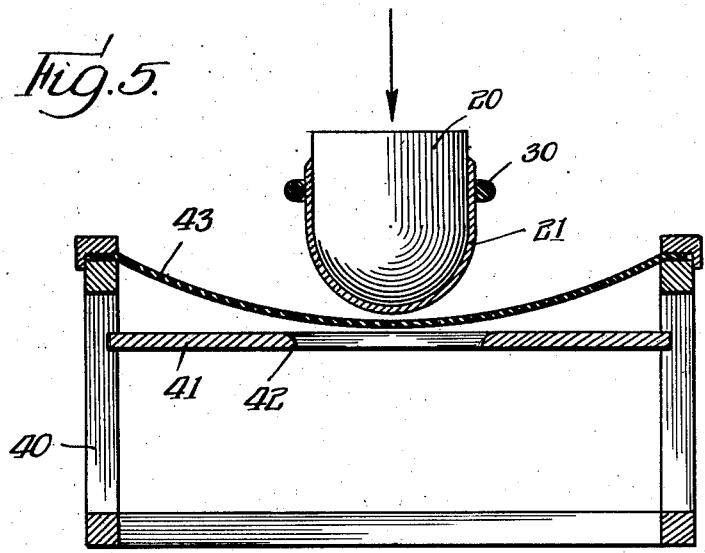
Fig. 5 is a fragmentary section through an apparatus illustrating a step in preparing the assembly for the curing operation.

While the invention is herein disclosed in connection with two different forms of apparatus which facilitate the use of the invention, it is to be understood that the invention is not limited to performance in connection with any particular apparatus. The scope of the invention will be pointed out in the appended claims.

With reference to Figs. 1 to 4, the method of the invention comprises, generally, the cutting of segments of plywood to fit the desired finished shape, assembling these segments in a substantially flat plane with the segments in layers and extending radially from a central point whereat they are partly overlapped, clamping the overlapped portions of the segments to a form, then bending the parts along the form and squeezing them uniformly in a direction at right angles to the plane in which they were assembled so as to cause the segments to fall into their proper overlapped relation around the form, and then securing the segments to the form at the base and at intermediate points between the base and the apex before removing the clamp at the mid-point.

Referring to Figs. 1 to 4, 20 represents a dome shaped form made of wood or other suitable material having the shape it is desired to give to a laminated article. A plurality of segments of material such as plywood, impregnated cloth, paper, etc., are previously cut to the shape necessary to provide overlapped layers of the material when the pieces are finally bent to conform to the shape of the form 20. These somewhat pie-shaped pieces 21 are then assembled with their narrow ends adjoining or overlapping at the mid-point 22 of the form 20 and extending radially outwardly therefrom, as illustrated in Figs. 1 and 2. Intermediate the layers of plywood, circular pieces 23 of resin impregnated cloth or paper are placed to serve as a binder between the parts when the assembly is finally cured. The plywood pieces are preferably assembled in a substantially flat plane, as illustrated in Fig. 1, by utilizing a removable table consisting of plates 24 and 25, having semicircular cut-away portions 26 and 27, respectively, forming a circular aperture through which the form 20 can extend slightly. After the parts are assembled, as shown in Fig. 1, a cylindrical clamp member 28 having a concave under-surface 29 is brought down against the upper surface of the assembled parts and serves to clamp these parts onto the form 20 at its mid-point 22. 30 represents an annular member of resilient material such as rubber which is preferably placed in the position shown in Fig. 1 before the clamp is applied.

After the adjoining ends of the plywood parts are clamped to the form, the plates 24 and 25 are removed and then the annular rubber ring 30 is forced downwardly from the position shown in Fig. 1 to the position shown in Fig. 3. The ring is preferably of an original diameter such that when it reaches the final location of Fig. 3 it has enough tensile strength to hold the lower ends of the plywood parts against the form. During this forming operation the plywood parts properly interleave and overlap each other and acquire approximately the ultimate shape desired. It is contemplated that a heat curing adhesive will be applied to the plywood, or portions thereof, prior to the assembling operation, so that during a subsequent curing operation the parts will be properly secured together. Generally such an adhesive may consist of a heat-setting phenol formaldehyde glue of the type generally used in plywood made with a hot press method.

When the parts are in the positions shown in Fig. 3 the upper ends of the plywood pieces 21 may be secured together by a plurality of fine wire staples 31 which are driven into the plywood and extend only through the several layers and not into the form 20. In some instances the lower portion of the plywood pieces can be suitably taped to the form, although with the particular form illustrated the annular rubber ring 30 may be relied upon to hold the parts until the assembly is inserted in a molding apparatus of the type illustrated in Fig. 5.

Figure 6:
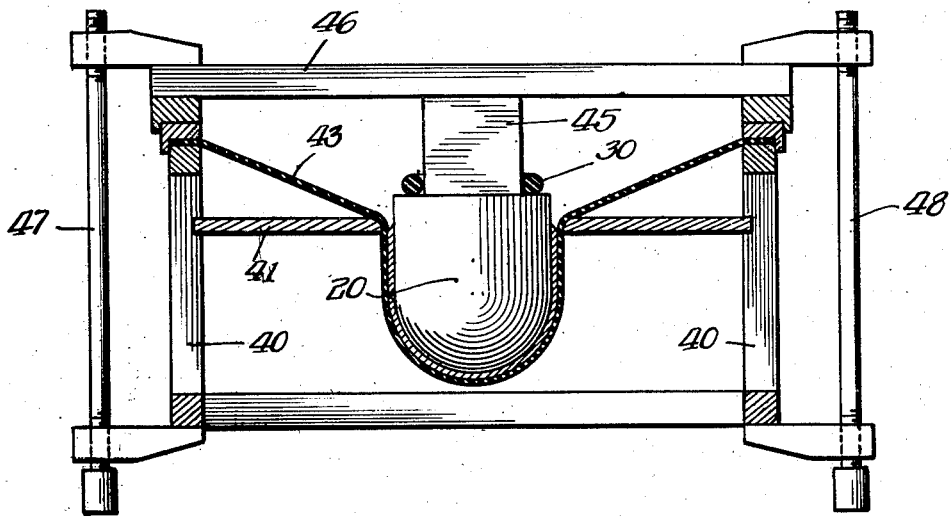
Fig. 6 is a similar view showing the assembly in an apparatus ready for the curing operation.

In Figs. 5 and 6 there is illustrated an apparatus of the type used in performing the process for molding materials under heat and pressure disclosed in an application for United States Letters Patent, Serial No. 483,540, filed April 19, 1943, by Harold J. Luth, Herman B. Scheidemantel and Sydney R. Krupnick. This apparatus consists of a framework 40, generally square in horizontal section, and having a square table 41 provided with a central circular aperture 42. A sheet 43 of high tensile strength cured rubber is secured at its edges between suitable clamping surfaces provided around the upper edge of the frame 40. The assembly from Fig. 3, with the clamp 28 removed, is inserted as shown in Fig. 5 and moved downwardly to the position of Fig. 6, during which time the rubber sheet 43 is elongated preferably 150 to 200 percent in the portion surrounding the form 20 and serves not only to compact the plywood parts firmly against the form but also, during a subsequent curing operation, to increase the pressure compacting the plywood parts, as set forth more fully in said co-pending application. As illustrated in Fig. 6 a pressure block 45 has been inserted between the form 20 and a pressure bar 46, and clamps 47 and 48 have been applied to hold the parts in their assembled relation. As the form 20 reaches its final position the annular rubber ring 30 is pushed upwardly to a position surrounding the block 45.

A modification of the method will be described in connection with Figs. 7 to 10. As illustrated in those figures, similar adhesive coated plywood parts 21 are assembled on the form 20 in proper overlapped relation around the lower portion of the form. An annular rubber ring 30 is applied to hold the lower end of the plywood parts to the form, after which semi-circular clamping members 50 are applied to hold the lower ends of the plywood against the form. The ring 30 is then rolled upwardly on the assembled plywood and squeezed inwardly as shown in Fig. 8 so as to bend the plywood parts in proper overlapped relation against the dome portion of the form. Suitable tape 51 may be applied to the plywood to hold it against the form. The upper pointed ends of the plywood can finally be pressed against the form by means of a concave clamping member 28 of the type illustrated in Figs. 1 and 3, after which fine wire staples may be inserted through the layers of plywood adjacent the edge of the clamp member. The ring 30 is then removed, after which the assembly can be inserted in an apparatus of the type shown in Figs. 5 and 6, the clamp members 50 being removed as the assembly approaches its final position.

The method of assembling and forming plywood as herein disclosed effects great economies in labor, compared with methods previously used. Furthermore it results in uniformity, so that many duplicate plywood parts can be made. The method largely eliminates the need for highly skilled craftsmen, and greatly speeds up production. It enables the building of the parts without the use of nails or staples of the large variety which leave holes which must be patched, and which also leave holes in the form itself.

Preferably the plywood parts, after being formed, are held aaginst the form during the curing and setting operation by means of elongated rubber sheets, as herein disclosed. However it is to be understood that other means may be employed for effecting the compression of the plywood parts against the form and holding them, as for example, unstretched rubber or other flexible material which may be placed around the assembled parts and form and thereafter subjected to fluid under pressure so as to compress the material against the parts and the parts against the form.

I claim as my invention:

1. A method of constructing a plywood article on a convex form comprising cutting a plurality of parts of plywood in shapes necessary to form the article when fitted together, applying an adhesive to said parts, assembling a plurality of layers of said parts in a substantially flat arrangement with the parts extending radially from a point on said convex form, the edges of the parts of each layer being disposed in abutting relation adjacent said point, with said edges of the parts of one layer overlying the areas intermediate the edges of the parts composing an adjacent layer, clamping the adjoining ends of the plywood parts to the form at said point, moving the free portions of the parts transversely of the plane of their flat arrangement until they assume their proper positions composing the desired article, securing the parts together adjacent their clamped ends and compressing said parts compactly together during the setting of the adhesive.

2. A method of constructing a laminated shape of curved contour which comprises cutting a plurality of parts of thin material to the shapes necessary to compose the article when fitted together, applying an adhesive to said parts, assembling the parts in a substantially flat arrangement, said parts extending radially from a point in a plurality of layers, with the edges of the parts of each layer in abutting relation adjacent said point and with the parts of one layer overlapping the abutting edges of an adjacent layer, clamping said adjoining end portions of the parts together at said point, moving the free portions of said parts in a direction transverse to the plane of their flat arrangement and to an extent to cause said parts to move into positions composing an article of the desired shape, with the parts of one layer overlapping the joints between adjacent parts of the next layer, confining the free ends of the parts in this final position of their assembly, compressing the parts compactly together and holding them in their final positions during the setting of the adhesive.

3. A method of forming a plywood article having a curved shape comprising cutting a plurality of parts of plywood to the shapes necessary to compose the article, applying an adhesive to said parts, assembling said plywood parts in a substantially flat arrangement in a plurality of layers with the parts extending radially from a point and in substantially final arrangement relative each other adjacent said point, clamping the adjoining portions of the plywood parts together at said point, moving the free portions of the plywood substantially simultaneously in a direction transverse to the plane of their flat arrangement and to an extent to curve said parts in the desired shapes and to bring them into their proper relative relation to each other to compose the article, and compressing the layers of parts compactly together during the setting of the adhesive.

4. A method of building a plywood article of curved shape which comprises cutting a plurality of segments of heat-setting adhesive-impregnated wood calculated to form the curved shape when assembled edge to edge, assembling the segments in a plurality of layers with the edges of the segments of each layer in abutting relation at one end of the assembly and with said edges of one layer overlying the areas between the edges of the adjacent layer, clamping the layers together at said end of the assembly, applying pressure simultaneously against all the segments adjacent said clamped end of the assembly and then progressively along the segments to the other ends thereof, thereby curving the segments to the shape desired with the edges of the segments of each layer in abutting relation to each other, clamping the segments together while in said shape, and then applying pressure to substantially the entire surface of the assembly and applying heat to set the adhesive and secure the layers together while thus subjected to said pressure.

5. A method of building a plywood article of curved shape which comprises cutting a plurality of segments of adhesive-impregnated material in shapes to form the article when assembled edge to edge, assembling a plurality of layers of such segments so that they extend radially from a central point with their edges in abutting relation close to said point and with the segment edges of one layer overlying the areas between the segment edges of the adjacent layer, simultaneously bending all the segments in a curved form while maintaining them in assembled relation at said point until the segments reach the desired shape, compressing the segments together while in such curved form and holding them to said form during the setting of the adhesive for securing the layers together.

HAROLD J. LUTH.